United States Patent [19]

Hansen

[11] Patent Number: 4,526,481
[45] Date of Patent: Jul. 2, 1985

[54] ENGINE TEMPERATURE SENSOR

[75] Inventor: Jorgen Hansen, Ejaeverskov, Denmark

[73] Assignee: Elmwood Sensors Limited, North Shields, England

[21] Appl. No.: 299,282

[22] Filed: Sep. 4, 1981

[30] Foreign Application Priority Data

Sep. 3, 1980 [GB] United Kingdom ............... 8028372

[51] Int. Cl.$^3$ ............... H01H 35/00; G08B 21/00; G01K 7/16
[52] U.S. Cl. .................. 374/144; 307/117; 374/183
[58] Field of Search ............ 374/144, 178, 179, 183, 374/185; 307/170, 117; 361/399; 340/596, 57; 374/11, 111

[56] References Cited

U.S. PATENT DOCUMENTS

| | | | |
|---|---|---|---|
| 3,237,156 | 2/1966 | Irvine | 340/57 |
| 3,335,292 | 8/1967 | Alburger | 307/361 X |
| 3,553,487 | 1/1971 | Freeborn | 307/361 X |
| 3,622,975 | 11/1971 | Vanderberg | 340/57 |
| 3,828,332 | 8/1974 | Rekac | 374/185 X |
| 3,913,058 | 10/1975 | Nishio et al. | 374/144 |
| 3,927,571 | 12/1975 | Athey | 374/11 |
| 3,939,687 | 2/1976 | Waldron | 307/117 X |
| 4,002,924 | 1/1977 | Busch | 307/117 |
| 4,012,906 | 3/1977 | Hattori et al. | 374/144 |
| 4,033,180 | 7/1977 | Massa | 73/649 X |
| 4,172,982 | 10/1979 | Kompelien | 307/117 |
| 4,211,113 | 7/1980 | Hartison | 374/170 |
| 4,299,117 | 11/1981 | Andrews et al. | 374/145 X |
| 4,329,550 | 5/1982 | Verley | 361/399 |

OTHER PUBLICATIONS

Publ. "A Dip-Stick Probe", Elektor (No. 60/Apr. 1980) 2 pages.
Publ. "Sensoren Fur die Automobil-Elektronik", Josef Schürmann, Automobil-Elektronik, vol. 50, No. 14, 1978, 4 pages.
Publ. "Temperature Sensors", Navy Tech. Disclosure Bulletin, vol. 4; No. 10; Oct. 1979, Cat. No. 3800, pp. 51-58.
Publ. "Elmwood Electronic Sensors", Elmwood Sensors, Ltd., England, Printed 8/1979, 6 pages.
"Voltage Switching For Proportional Temperature Control", EEE Circuit Design Engineering, vol. 15, No. 4, pp. 99-99, Apr. 1967, (Brookmire, J. L.).

Primary Examiner—Daniel M. Yasich
Attorney, Agent, or Firm—Salter & Michaelson

[57] ABSTRACT

An engine temperature sensor may be screwed into the engine block and is provided internally with electronic switch circuitry controlled by an NTC device. The sensor has external terminals for connecting to various temperature-related functions in the engine, such as an automatic choke, a petrol pre-heating device and an overheating indicator, and is capable of switching these functions on and off individually at the temperatures which have been pre-set for each function.

4 Claims, 3 Drawing Figures

ENGINE TEMPERATURE SENSOR

This invention relates to engine temperature sensors.

In a modern automobile engine there are a number of engine functions, varying from model to model, which for optimum performance and economy require to be controlled in dependence upon engine temperature. For example, certain functions such as chokes, petrol pre-heaters and ignition advance and retard mechanisms, are required to operate when the engine is cold but will prevent correct running of the engine if allowed to continue operating above a certain engine temperature; this temperature being peculiar to each type of device. In other cases, an over-heating indicator may be required to be energised if the temperature exceeds a certain limit or the speed of a multi-speed cooling fan increased as the engine temperature passes pre-set thresholds.

Conventionally, each temperature related function in the engine is controlled through its own thermostat which has a switch operated mechanically through thermal expansion in a bimetallic part or in a cylinder of wax material. Since the functions are required to be switched on and off at different temperatures, it is not possible to use one such thermostat to operate more than one function. Each thermostat is—typically—screwed into a corresponding threaded aperture in the engine block so as to extend into a coolant chamber. A serious difficulty with this arrangement is that there are a very limited number of places in which a thermostat can be mounted in the engine so as to sense the coolant temperature. Moreover, since the coolant temperature is far from uniform throughout the block, there may only be one location at which the relationship between sensed temperature and engine running conditions is at an optimum for control purposes. Because of this, it has been necessary for designers to decide on a priority between the various functions which are to be controlled, placing the thermostat associated with the most important function at the optimum location and placing the remaining thermostats which ideally should be located in the same position, at compromise locations.

It is an object of this invention to overcome this disadvantage by providing an improved engine temperature sensor which is capable of controlling a plurality of engine functions, each having a different desired temperature dependence.

The term "temperature related engine function" is used throughout this specification, including the claims, to mean an engine function, the operation of which is to be controlled in dependence upon engine temperature; examples of such functions are over-heating indicators, chokes, petrol pre-heaters, ignition advance and retard mechanisms and cooling fans.

According to one aspect of the present invention there is provided an engine temperature sensor outwardly shaped for mounting in an engine chamber wall with a sensing part thereof extending into the engine chamber, the sensor comprising a plurality of terminals for electrical connection with respective temperature related engine functions such that the voltage at each terminal controls the operation of the corresponding engine function; semiconductor switch means respectively connected with the terminals so that different voltages are present at each terminal in the ON state and the OFF state respectively of the corresponding switch means; a temperature responsive element having a substantial temperature coefficient of resistance mounted in said sensing part so as to be exposed to the temperature in the engine chamber; means connecting the element with each of the switch means is dependent upon the resistance of said element and a biasing means that the change in switching states thereof occur at respective different levels in the range of resistance values of the element, whereby in use the engine functions are operated at respective selected temperatures.

The invention will now be described by way of example with reference to the accompanying drawings, in which.

Figure 1:
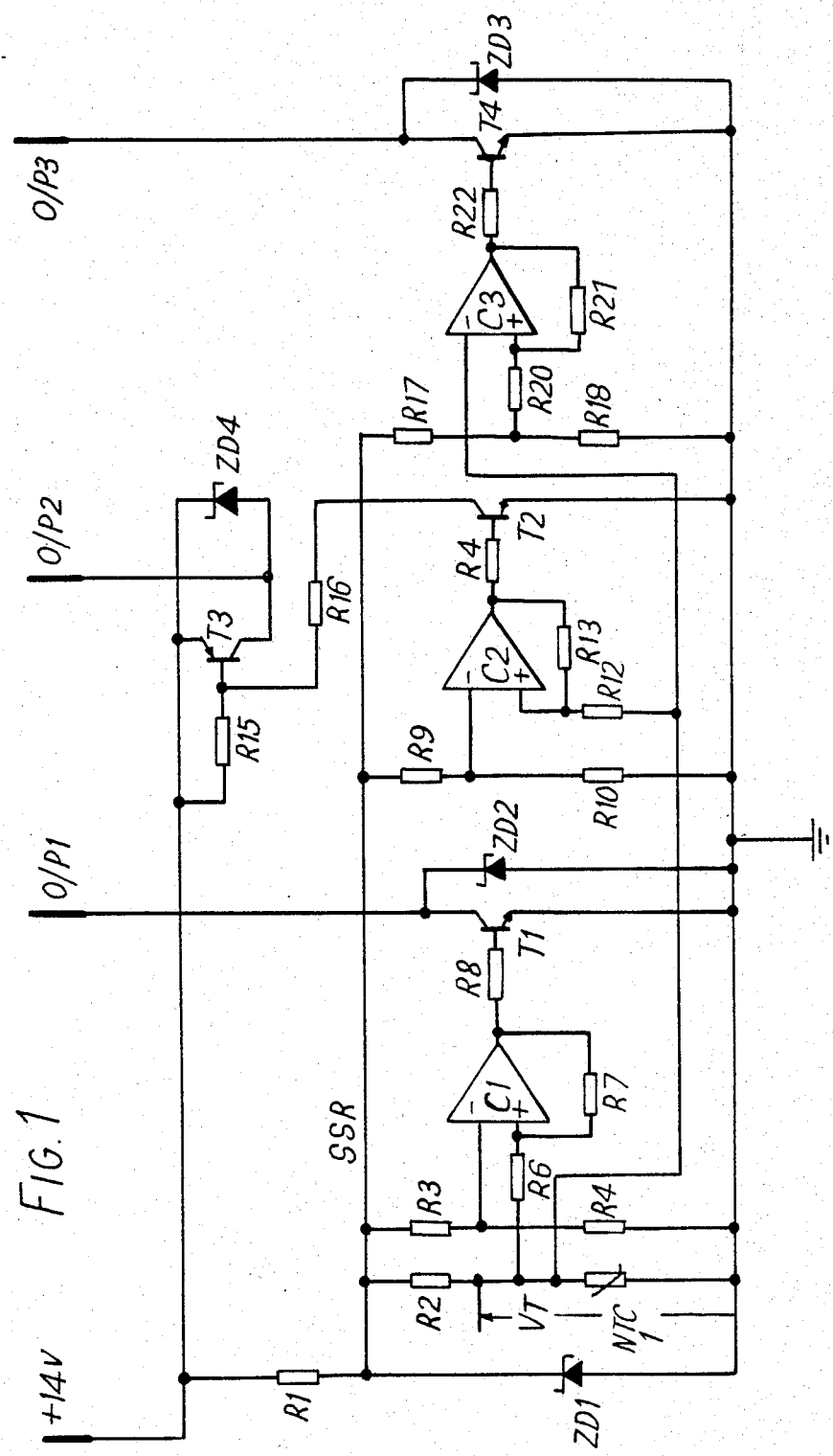
FIG. 1 is a circuit diagram for a sensor according to the invention.

Referring to FIG. 1, resistor R1 and Zener diode ZD1 are connected in series between the +14 V terminal and the earth rail, their common point being connected to a supplementary supply rail SSR. Three comparators, C1, C2 and C3, provided in one integrated circuit, have supply connections, not shown, to the SSR and to the earth rail. The first comparator has its inverting input connected to the common point of resistors R3 and R4 which lie in series between the SSR and the earth rail and from a reference voltage network. The non-inverting input is connected through the resistor R6 to the common point of resistor R2 and an NTC device a negative temperature coefficient device which inherently has a substantial temperature coefficient of resistance NTC 1 which again lies in series between the SSR and the earth rail. The output of comparator C1 is connected through feedback resistor R7 with the non-inverting input and through output resistor R8 to the base of transistor T1. The emitter of T1 is connected to the earth rail and the collector to load terminal O/P 1. Zener diode ZD 2 connected between the earth rail and the collector of transistor T1 provides overload protection.

Comparator C2 is connected in a similar fashion with a reference voltage network comprising resistors R9 and R10 setting the inverting input level, resistor R12 connecting the non-inverting input to the common point of NTC 1 and R2, feedback resistor R13 and output resistor R4 connecting the output of C2 to the base of transistor T2. Transistor T2 has its emitter connected to the earth rail but the collector is connected not directly to the terminal O/P 2 but through an amplifying stage. In particular, the collector is connected through resistor R16 to the base of transistor T3, the base being also connected to the +14 V terminal through resistor R15. The emittor of transistor T3 is connected to the +14 V terminal and the collector to terminal O/P 2. Zener diode ZD 4 is connected between the collector and emitter of T3 to provide overload protection.

Comparator C3 differs from C1 and C2 in that it is the inverting rather than the non-inverting input that is connected to the common point of NTC 1 and resistor R2. The non-inverting input is connected through resistor R20 to the common point of resistors R17 and 18 lying in series between the SSR and the earth rail, these resistors forming a reference voltage network. The output of C3 is connected through feedback resistor R21 to the non-inverting input and through load resistor R22 to the base of a transistor T4 having its emitter connected to the earth rail and its collector connected to terminal O/P 3. Overload protection is provided by Zener diode ZD 3 connected between the earth rail and the collector of T4.

It will be appreciated that the potential divider comprising NTC 1 and R2 provides a temperature dependent voltage $V_t$ which is applied to the non-inverting inputs of comparators C1 and C2 and the inverting input of comparator C3. Each comparator operates to compare this temperature dependent voltage with a substantially constant voltage set up, for C1, by resistors R3 and R4, for C2 by resistors R9 and R10 and for C3 by resistors R17 and R18.

At a low temperature the resistance of the NTC device will be high so that the temperature dependent voltage $V_t$ will be high with respect to the earth rail. Resistors R3 and R4 are selected to give a voltage equivalent to $V_t$ at 58° C. R9 and R10 are set to give a voltage equivalent to $V_t$ at 35° C. and R17 and R18 are set to give a voltage equivalent to $V_t$ to 120° C. With these conditions, at temperatures below 35° C. the outputs of C1 and C2 will be high, turning on transistors T1 and T2 and the output of C3 low, turning off T4. Considering terminal O/P 1, this may be connected to a relay which will be energised to operate, for example, a petrol pre-heating device. Current passing through transistor T2 will turn on transistor T3 to energise, for example, a choke device connected to terminal O/P 2. Finally, terminal O/P 3 may be connected to an overheating indicator lamp which will in this condition be turned off.

As the temperature rises, $V_t$ will fall and when the temperature exceeds 35° C., the non-inverting input of C2 will fall below the level of the fixed inverting input and transistors T2 and T3 will be turned off thus de-energising the choke. Similarly, as the temperature exceeds 58° C. the output of comparator C1 will fall negative turning off transistor T1 and de-energising the relay and hence the petrol pre-heating device. If the temperature should exceed 120° C., $V_t$ will no longer be sufficient to hold down the output of comparator C3 and transistor T4 will be switched on to energise the over-heating indicator.

Figure 2:
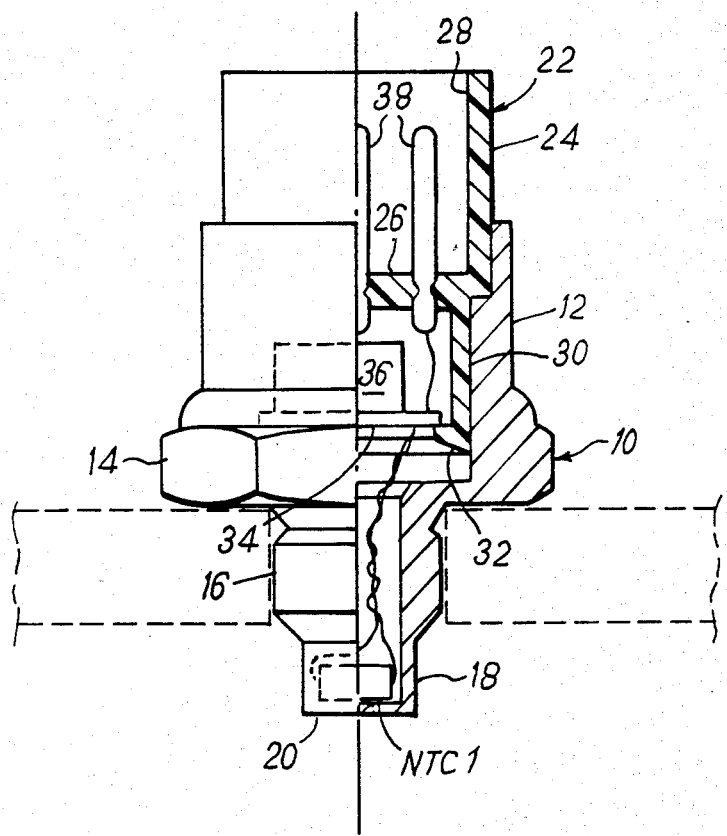
FIG. 2 is a part sectional view of a sensor according to the invention.

Referring now to FIG. 2 it can be seen how to circuit elements of FIG. 1 are incorporated in a sensor according to this invention. The sensor comprises a formed brass part 10 having a cylindrical housing portion 12; a hexagonally shaped portion 14; an outwardly threaded portion 16 which is of significantly smaller diameter than either the hexagonal portion or the housing portion; and a sensing part 18 in the form of a cylindrical tube closed by end face 20. It is to be noted that the wall of the sensing part 18 is thin compared with the remainder of the part 10.

Within the housing portion 12 there is located an insulating part 22 comprising a cup shaped piece 24 formed from circular end wall 26 and cylindrical side wall 28, together with an integral skirt 30 which, as seen in the Figure, extends inwardly of the brass part 10. The insulating part 22 is bonded to the brass part 10 in any suitable, watertight fashion.

At its end remote from the circular wall 26, the skirt 30 is formed with a flange 32 which serves to locate a generally circular printed circuit board 34. This circuit board carries the power components shown in FIG. 1 together with a supplementary printed circuit board 36 which is upright as shown in the drawing and which carries the integrated circuit of FIG. 1 and the associated low-current components. The board 34 is connected through wires to the NTC device which is located in the sensing part 18, bonded to the end wall 20 by, for example, soldering. Wires also extend from the board 34 to the inner ends of four pin terminals 38 (not all shown) which extend through, and are secured in, the end wall 26 of part 22; these pin terminals 38 correspond respectively with the terminals in FIG. 1 which are marked +14 v, O/P1, O/P2 and O/P3. It will be seen from the Figure that the circular wall 28 serves as a shroud for the pin terminals 38.

It will be understood that the construction shown in FIG. 2 is but one example of a wide variety of embodiments falling within the scope of this invention. In other embodiments the number, shape and location of the load terminals 38 will depend upon the application and the manner in which the sensor is mounted may differ from the screw thread used in the illustrated embodiment. Similarly, the location of the circuitry on one main board carrying the power components and a supplementary board, mounted on the main board, with a hybrid arrangement of one discrete integrated circuit and various associated components, is but one example of the techniques that are available. The use of a formed brass part externally shaped with a hexagonal portion is conventional, but other materials and constructions can be employed as will be evident to the skilled man.

The illustrated sensor is used to control a petrol preheating device, an automatic choke and an over-heating indicator; the skilled man would appreciate that there are various other temperature related engine functions that could be controlled in addition to, or in place of, these three.

Figure 3:
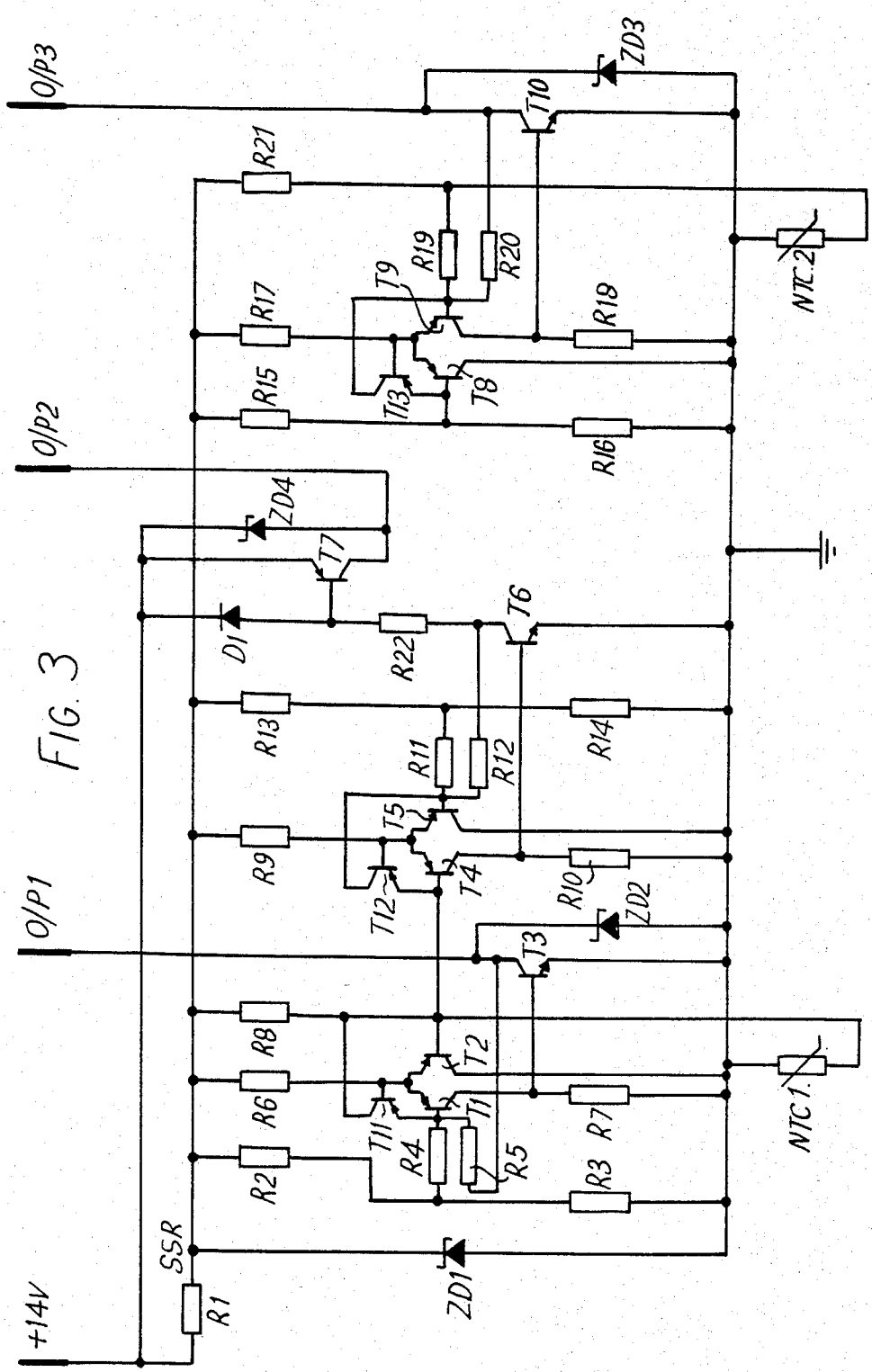
FIG. 3 is an alternative circuit diagram for a sensor according to the invention.

By way of further description of the invention, reference is now had to FIG. 3 which shows an alternative circuit diagram differing in a number of respects from the circuit diagram of FIG. 1.

Resistor R1 and Zener diode ZD 1 are connected in series between the +14 V terminal and the earth rail and from their common point there extends a supplementary supply rail SSR. An NTC device NTC 1 is connected in series with a resistor R8 between the SSR and the earth rail and their common point is connected to the base of a transistor T2 of a long tailed pair. The base of the other transistor T1 is connected through resistor R4 to the common point of two resistors R2 and R3 connected in series again between the SSR and the earth rail. The common connected emitters are connected through resistor R6 with the SSR and the two collectors are connected to the earth rail directly in the case of transistor T2 and via resistor R7 in the case of T1. The collector of T1 is further connected to the base of a transistor T3 having its emitter connected to the earth rail and its collector connected to output terminal O/P 1. The collector of T3 is further connected through resistor R5 to the base of T1. It will be understood that the resistors R2 to R8 provide a biassing resistor network for the long tailed pair. A Zener diode ZD 2 is connected between the collector of transistor T3 and the earth rail and a further transistor T11 is connected with its base to the common emitters of the long tailed pair, its emitter to the base of T1 and its collector at the base of T2; the function of both these components is to protect against overloads.

The common point of resistor R8 and NTC 1 is also connected to the base of a transistor T4 forming half of a second long tailed pair. The connection of this second long tailed pair is analogous with the first and detailed description is not considered to be necessary beyond pointing out that the collector of T6 is connected to O/P 2 through an amplifier stage similar to that shown in FIG. 1, with resistor R15 of FIG. 1 being replaced by diode D1.

A second NTC device, NTC 2, is connected in series with a resistor R21 between the SSR and the earth rail, with the common point being taken through resistor R19 to the base of one transistor T9 of a third long tailed pair. The arrangement of the third long tailed pair and the interconnection with transistor T10 controlling the energization of terminal O/P 3 is analogous to that of the first two long tailed pairs and is not considered to require detailed description.

At low temperatures, NTC 1 and NTC 2 have high values of resistance so that the voltages of the bases of T2, T4 and T9 are biassed toward the SSR. Resistors R2 and R3 are selected so that the voltage on the base of T1 is nearer to 0 volts than that of T2 so that current flows into the base of T1 switching it on and switching T2 off. Current flows accordingly into the base of T3 switching T3 on and energising a relay (not shown) which may in use of the sensor be connected to O/P 1. Similarly, R13 and R14 are selected so that T4 is switched on thus switching on T6 and T7 and energising a choke device (not shown) which may in use be connected to terminal O/P 2. Resistors R15 and R16 are selected so that T8 is switched on and T9 switched off. No current accordingly flows into the base of T10 and a bulb (not shown) which may in use be connected to terminal O/P 3 is not energised.

As the temperature rises and reaches 38° C. the resistance of NTC 1 has fallen sufficiently for T4 to be switched off. T6 is therefore also switched off and the choke device de-energised. At 58° C. T2 is turned on thus turning off T1 and T3 and de-energising the relay. If the temperature continues to rise to 120° C. the resistance of NTC 2 will fall to such a level that T8 is turned off and T9 turned on. T10 is therefore turned on and the bulb is energised.

Resistors R5, R12 and R20 are included in this circuit to provide a different switching level between turn on and turn off.

As with the circuit shown in FIG. 1, there are various modifications that can be made to the circuit without departing from the scope of the invention. To give one example, the described arrangements of one or two NTC devices could be replaced by other electronic temperature responsive means. Use could be made, for instance, of the temperature dependence of the base emitter voltage of a transistor.

I claim:

1. An engine temperature sensor comprising:
   a. a housing outwardly shaped for mounting in an engine chamber wall with a sensing part thereof extending into the engine chamber;
   b. a plurality of load terminals extending from said housing for electrical connection with respective temperature related engine functions whereby the electrical signal at each said terminal controls, in use, the operation of a corresponding engine function;
   c. a temperature responsive element having a substantial temperature coefficient of resistance and being mounted in the sensing part of the housing;
   d. electrical circuit board means mounted in said housing and having a first electrical connection which is connected to said temperature responsive elements and a plurality of second electrical connections which are connected to different load terminals;
   e. a plurality of semiconductor switch means mounted on said electrical circuit board means and connected with different load terminals through said respective second connections for applying electrical signals thereto;
   f. reference voltage means comprising a plurality of reference voltage networks mounted on the electrical circuit board means and providing a plurality of reference voltages, one for each said switch means;
   g. integrated circuit means mounted on said electrical circuit board means and comprising a plurality of comparators, one for each said switch means, each comparator having a first input connected through said first electrical connection to said temperature responsive element, a second input connected to the reference voltage means to receive the reference voltage for the respective switch means and an output connected to the associated switch means such that the electrical signal at said output determines the switching state of the switching means, wherein the said reference voltages provided by the reference voltage means are selected so that the switch means change switching states at respective different levels in the range of resistance values of the temperature responsive element.

2. An engine temperature sensor outwardly shaped for mounting in an engine chamber wall with a sensing part thereof extending into the engine chamber, the sensor comprising a plurality of terminals for electrical connection with respective temperature related engine functions such that the voltage at each terminal controls the operation of the corresponding engine function; semiconductor switch means respectively connected with the terminals so that different voltages are present at each terminal in the ON state and the OFF state respectively of the corresponding semiconductor switch means; a temperature responsive element having a substantial temperature coefficient of resistance mounted in said sensing part so as to be exposed to the temperature in the engine chamber; means connecting the element with each of the semiconductor switch means so that the switching state of each of the switch means is dependent upon the resistance of said element and a biassing resistor network for each semiconductor switch means so biassing the semiconductor switch means that the changes in switching states thereof occur at respective different levels in the range of resistance values of the temperature responsive element, whereby in use the engine functions are operated at respective different selected temperatures.

3. A sensor according to claim 2, wherein the temperature responsive element forms part of a potential divider providing a temperature dependent voltage for the respective semiconductor switch means.

4. A sensor according to claim 2, wherein each semiconductor switch means includes a comparator serving to compare the output from the temperature responsive means with the output from the respective biassing network.

* * * * *